US006862885B1

(12) United States Patent
Mitchell

(10) Patent No.: US 6,862,885 B1
(45) Date of Patent: Mar. 8, 2005

(54) AIR INJECTION APPARATUS FOR A TURBOCHARGED DIESEL ENGINE

(75) Inventor: Herman R. Mitchell, Dayton, OH (US)

(73) Assignee: Super Drive, Inc., Piqua, OH (US)

( * ) Notice: Subject to any disclaimer, the term of this patent is extended or adjusted under 35 U.S.C. 154(b) by 0 days.

(21) Appl. No.: 10/718,160

(22) Filed: Nov. 20, 2003

(51) Int. Cl.[7] .......................... F02B 33/44; F02B 33/00; F01N 3/00
(52) U.S. Cl. ............................. 60/606; 60/280; 60/289; 123/559.3
(58) Field of Search .................... 123/559.3, 563; 60/606–608, 280, 289; 290/45

(56) References Cited

U.S. PATENT DOCUMENTS

| 4,091,620 | A | | 5/1978 | Dorsch ...................... 60/606 |
|---|---|---|---|---|
| 4,322,949 | A | | 4/1982 | Byrne ........................ 60/606 |
| 4,674,283 | A | | 6/1987 | Ishida ........................ 60/606 |
| 4,729,225 | A | * | 3/1988 | Bucher ...................... 60/608 |
| 4,803,969 | A | * | 2/1989 | Hiereth et al. ............... 60/608 |
| 5,095,691 | A | * | 3/1992 | Yoshimura .................. 60/289 |
| 5,847,470 | A | * | 12/1998 | Mitchell ...................... 290/45 |
| 6,094,909 | A | * | 8/2000 | Weber et al. ................. 60/280 |
| 6,205,786 | B1 | | 3/2001 | Hasler |
| 6,334,436 | B1 | * | 1/2002 | Paffrath et al. ............. 123/563 |

FOREIGN PATENT DOCUMENTS

| DE | 2326989 | | 12/1974 | .......... F02B/37/10 |
|---|---|---|---|---|
| DE | 4338696 | | 5/1995 | ............ F01N/3/22 |
| DE | 19647959 | C | 11/1997 | .......... F02B/37/10 |
| DE | 19833148 | A | 1/2000 | .................. 60/602 |
| EP | 1233162 | A1 | 8/2002 | .......... F02B/37/10 |
| GB | 1140877 | A | 1/1969 | .......... F02B/37/10 |
| GB | 2121474 | A | 12/1983 | .................. 60/606 |
| JP | 61 070115 | A | 8/1986 | .......... F02B/37/12 |
| JP | 06323152 | A | * 11/1994 | .......... F02B/37/10 |

* cited by examiner

Primary Examiner—Thai-Ba Trieu
(74) Attorney, Agent, or Firm—Mark A. Navarre

(57) ABSTRACT

A supercharger injects air into the engine exhaust manifold of an engine to dramatically improve turbocharger boost at low engine speeds, while cooling the gases in the exhaust manifold to reduce NOx formation. The injected air additionally reduces other exhaust emissions through secondary combustion, allowing the air/fuel ratio to be controlled closer to the stoichiometric ratio for improved thermodynamic efficiency. The engine is particularly well suited to high torque, low speed applications, such as a vehicle hydrostatic drive in which the engine is connected to drive a variable capacity hydrostatic pump at a low and substantially constant speed.

7 Claims, 2 Drawing Sheets

AIR INJECTION APPARATUS FOR A TURBOCHARGED DIESEL ENGINE

TECHNICAL FIELD

The present invention relates to engines equipped with or without exhaust-driven turbochargers, and more particularly to apparatus for improving the turbocharger boost at low engine speeds, while reducing engine exhaust emissions.

BACKGROUND OF THE INVENTION

High power diesel engines are commonly equipped with exhaust-driven turbochargers to increase the engine output power by boosting the intake air pressure, and hence the density of the air/fuel mixture in the engine cylinders. Turbocharging can also be used to reduce soot emissions when the engine is operated at higher-than-stoichiometric air/fuel ratios, albeit at the expense of thermodynamic efficiency. Unfortunately, turbocharging also tends to increase the formation of oxides of nitrogen (NOx) due to the increased exhaust gas temperature in the exhaust manifold, and is relatively ineffective at low engine speeds in any event. Accordingly, what is needed is a way of reducing exhaust emissions in a turbocharged diesel engine without sacrificing engine operating efficiency, while at the same time improving turbocharger performance at low engine speeds to make the engine suitable for high torque, low speed operation.

SUMMARY OF THE INVENTION

The present invention is directed to an engine preferably including a turbocharger coupled to an exhaust manifold of the engine and a supercharger for injecting air into the engine exhaust manifold at distributed locations thereof. The injected air dramatically improves turbocharger boost at low engine speeds, while simultaneously cooling the gases in the exhaust manifold to reduce NOx formation. The injected air additionally reduces other exhaust emissions through secondary combustion, allowing the air/fuel ratio to be controlled closer to the stoichiometric ratio for improved thermodynamic efficiency. The engine is particularly well suited to high torque, low speed operation, such as for a vehicle hydrostatic drive in which the engine is connected to drive a variable capacity hydrostatic pump at a low and substantially constant speed.

BRIEF DESCRIPTION OF THE DRAWINGS

The present invention will now be described, by way of example, with reference to the accompanying drawing, in which.

DESCRIPTION OF THE PREFERRED EMBODIMENT

The present invention is disclosed herein primarily in the context of a roadway vehicle such as a truck equipped with a continuously variable hydrostatic drive. However, it will be understood that the invention is also useful both in other vehicular applications and in non-vehicular applications such as power generation stations.

As indicated above, the present invention is fundamentally directed to an engine, and preferably a turbocharged diesel engine, in which a high flow of above-atmospheric pressure air is injected into the engine exhaust manifold at distributed locations to simultaneously improve engine power output, exhaust emissions and fuel efficiency. The injected air is provided by a supercharger, preferably at a flow rate of 100–250 CFM. The engine power output is improved because the injected air provides greatly increased exhaust airflow at low engine speeds to dramatically increase the turbocharger boost pressure. Although improved low speed power output is beneficial in nearly any application, it is especially beneficial in applications such as a vehicle hydrostatic drive in which the engine is operated at a low and substantially constant speed. The engine exhaust emissions are improved because the injected air: (1) reduces the gas temperature in the exhaust manifold well below the temperature at which NOx emissions are formed; (2) promotes more complete combustion of the air/fuel mixture in the engine to reduce soot; and (3) promotes secondary combustion in the exhaust manifold to reduce other exhaust emissions such as carbon monoxide (CO) and hydrocarbons (HC). The reduction of exhaust emissions through secondary combustion, in turn, allows the engine air fuel ratio to be operated closer to the ideal stoichiometric air/fuel ratio for improved thermodynamic efficiency. The engine fuel efficiency is further improved in constant speed applications such as continuously variable hydrostatic drives where losses associated with accelerating and decelerating the engine are minimized.

Figure 1:
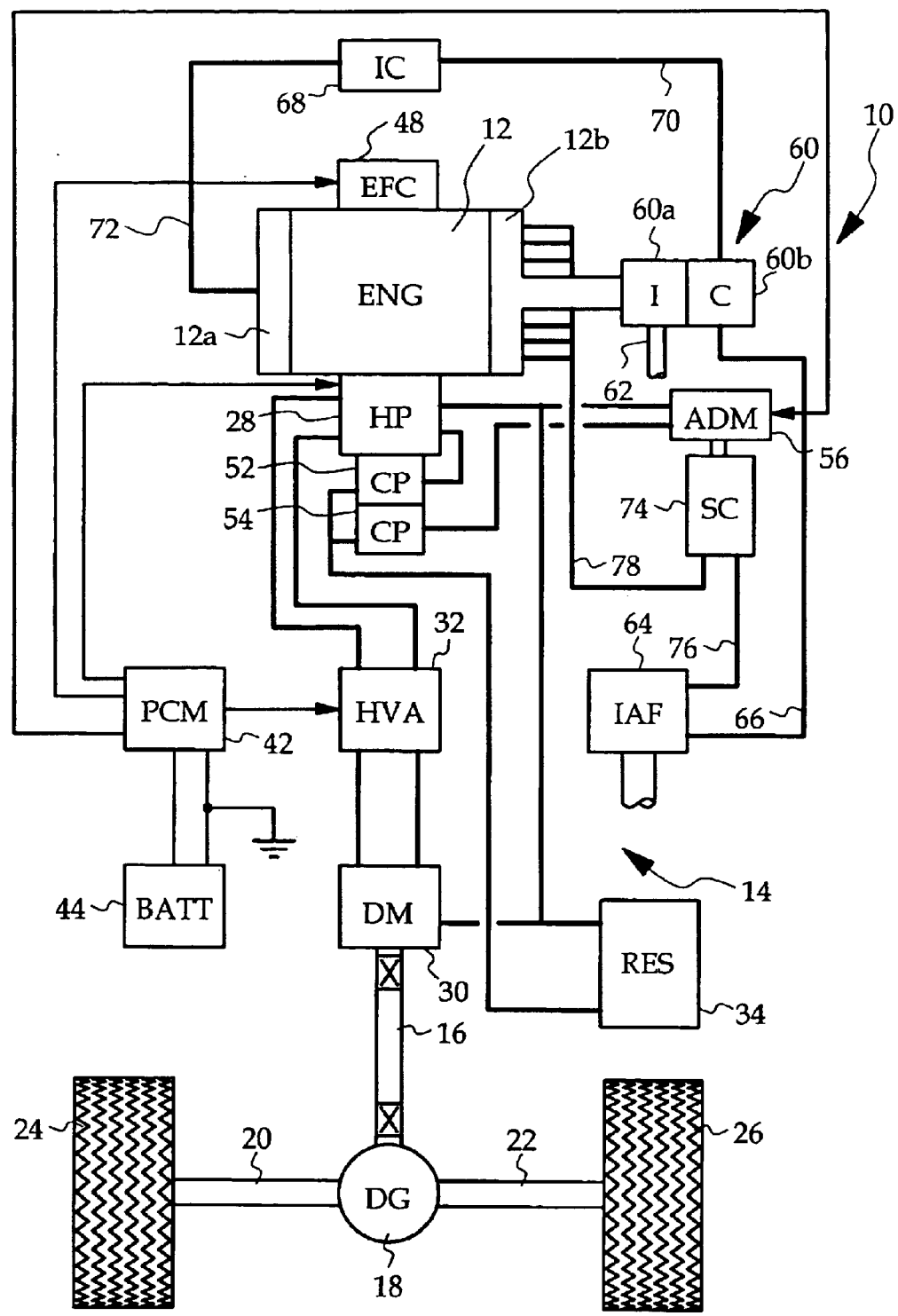
FIG. 1 is a system diagram of a vehicle powertrain embodying the principles of the present invention.

Referring to FIG. 1, the reference numeral 10 generally designates a motor vehicle powertrain including a diesel engine (ENG) 12 and a hydrostatic drive 14 for coupling the engine motive power output to a conventional drive arrangement including a drive shaft 16, a differential gearset (DG) 18, drive axles 20, 22 and drive wheels 24, 26. The hydrostatic drive 14 primarily includes a variable capacity hydraulic pump (HP) 28 driven by the engine 12, a hydraulic drive motor (DM) 30 coupled to the drive shaft 16, and a hydraulic valve assembly (HVA) 32. The drive motor 30 is preferably implemented with two individual drive motors ganged together; one drive motor is designed for high torque, low speed operation, while the other is designed for low torque, high speed operation. In general, the hydraulic pump 28 supplies fluid to drive motor 30 by way of hydraulic valve assembly 32, while directing a portion of the fluid to a reservoir 34. The HVA 32 is operated by the powertrain control module (PCM) 42, and includes a number of solenoid-operated valves that are selectively energized or deenergized by to control fluid flow. The PCM 42 is powered by a vehicle storage battery 44, and preferably includes a microcontroller for carrying out a prescribed control of HVA 32. The PCM 42 is also coupled to hydraulic pump 28 for controlling its pumping capacity, and to an engine fuel controller (EFC) 48 for controlling the quantity of fuel injected into the engine cylinders. In a particularly advantageous mechanization, PCM 42 controls the capacity of hydraulic pump 28 to satisfy the vehicle drive requirements, while controlling EFC 48 to maintain a low and substantially constant engine speed such as 1000 RPM. The hydrostatic drive 14 additionally includes first and second charge pumps (CP) 52, 54 ganged together with the HP 28. The first charge pump 52 supplies control pressure to HP 28 from reservoir 34, and the second charge pump 54 supplies hydraulic fluid from reservoir 34 to an auxiliary hydraulic drive motor (ADM) 56, described below.

Figure 2:
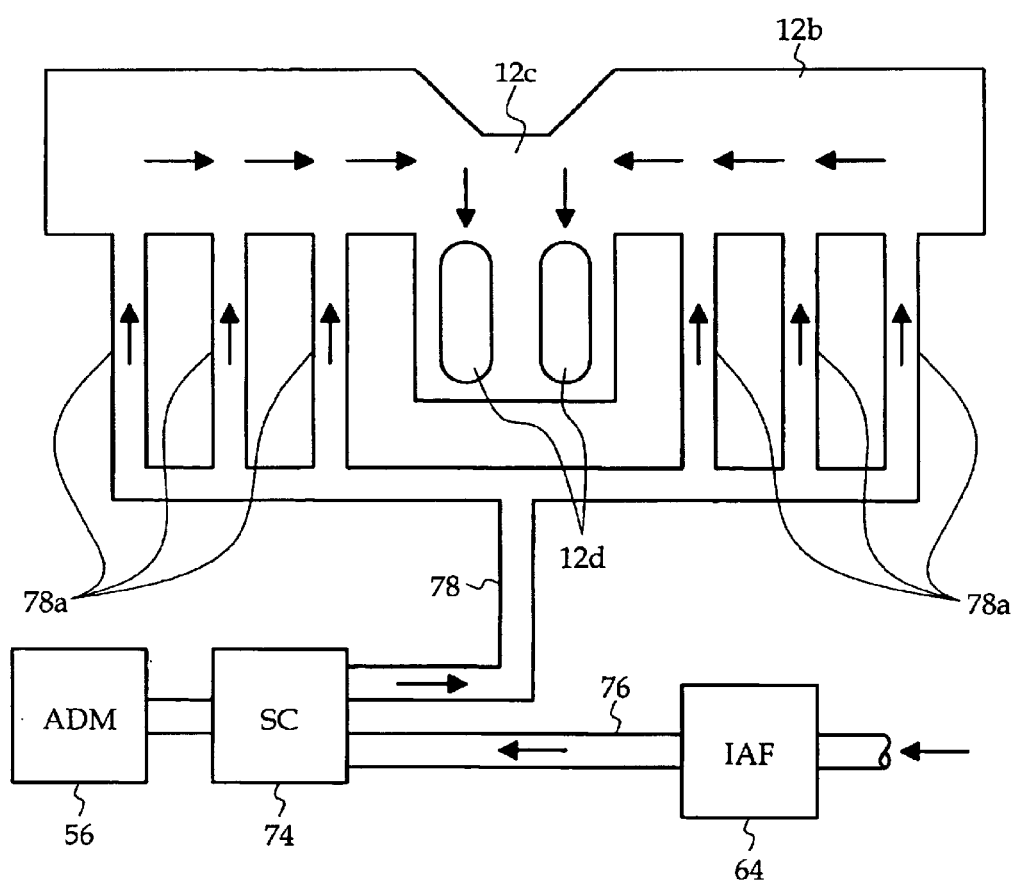
FIG. 2 is a diagram of the air injection portion of the powertrain of FIG 1.

The engine 12 includes an intake manifold 12a for receiving intake air and an exhaust manifold 12b for collecting the engine cylinder exhaust gases. FIG. 2 illustrates the exhaust manifold 12b of a typical diesel engine having in-line cylinder configuration. The cylinder exhaust gases are discharged into the left and right portions or runners of the exhaust manifold 12b, and are channeled toward a central collection plenum 12c with one or more exit ports 12d. In a typical application, the left-hand and right-hand portions of the exhaust manifold 12b may be separate castings that are individually bolted to the engine 12. In any event, the exhaust gas exit ports 12d lead to the impeller section (I) 60a of an exhaust-driven turbocharger 60 en route to an exhaust pipe or header 62. The impeller section 60a drives a compressor section (C) 60b of the turbocharger 60, which compresses atmospheric pressure air for delivery to the intake manifold 12a. The inlet atmospheric pressure air passes through an inlet air filter (IAF) 64, and is delivered to the compressor section 60b via low pressure conduit 66. The high pressure air at the outlet of compressor section 60b is passed though an intercooler 68 by the conduits 70, 72 en route to the intake manifold 12a.

In a conventional turbocharged diesel engine, the gas temperature in the exhaust manifold is well above 1700° F., the temperature above which NOx emissions are readily formed. Moreover, since a conventional turbocharger produces little boost at low engine speeds, the air/fuel ratio in the engine cylinders becomes too rich when the fuel delivery is increased to accelerate the engine. As a result, partially consumed fuel is discharged into the exhaust manifold, producing objectionable levels of soot until the engine speeds up and the turbocharger produces sufficient boost. The soot formation problem and the low speed power deficiency can be addressed by some external means that speeds up the turbocharger impeller or otherwise provides the intake air boost, but at the expense of increased NOx formation due to high cylinder and exhaust manifold temperatures and long residence times. The present invention, on the other hand, provides an approach that not only achieves low speed soot and power improvements, but also achieves significant improvements in NOx emissions and fuel economy.

Referring to FIG. 2, the present invention is carried out by using a mechanically driven supercharger (SC) 74 to deliver high pressure air to the exhaust manifold 12b at distributed locations along its length. The inlet air is passed through an inlet air filter 64 (which may be the same inlet air filter used by the turbocharger 60, or a different inlet air filter), and delivered to the supercharger inlet by a conduit 76. The supercharger outlet is coupled to a high pressure plenum 78 from which a number of branches 78a inject the air into distributed locations of the exhaust manifold 12b, preferably at a flow rate of 100–250 CFM. In a preferred embodiment, the number of branches 78a is equal to the number of engine cylinders discharging exhaust gases into the manifold 12b, and the air is injected in proximity to the points at which the exhaust gases are discharged into the manifold 12b. The temperature of the air injected into exhaust manifold 12b by supercharger 74 is approximately 307° F., effectively cooling the exhaust gasses to approximately 350° F., well below temperatures at which NOx emissions are readily formed. Interestingly, this also has the effect of reducing the required cooling capacity of the liquid coolant circulated through engine 12, thereby reducing the engine power requirements for coolant pumping and radiator airflow.

In the illustrated embodiment, the supercharger 74 is driven by a hydraulic accessory drive motor (ADM) 56 powered by hydraulic fluid from charge pump 54 as mentioned above. This is particularly advantageous in the context of a hydrostatic vehicle drive since the additional hydraulic fluid pressure for powering the supercharger 74 is available at very little extra cost, and the capacity of ADM 56 can be controlled by the PCM 42 as indicated to optimize the rotational speed of supercharger 74 regardless of the engine speed. Furthermore, the supercharger 74 may be located remote from the engine 12 as implied in FIGS. 1–2, which allows the supercharger 74 to be mounted in a location that provides cooler inlet air and easier mounting and routing of the air conduits. Of course, the supercharger 74 can alternatively be driven by a different rotary drive source such as an electric or pneumatic motor, or the engine 12.

In summary, the air injection apparatus of the present invention simultaneously contributes to improved exhaust emissions, engine power output and fuel efficiency, and makes a turbocharged diesel engine particularly well suited to highly efficient low constant speed operation in a hydrostatic vehicle drive. While the invention has been described in reference to the illustrated embodiments, it should be understood that various modifications in addition to those mentioned above will occur to persons skilled in the art. Accordingly, it will be understood that systems incorporating these and other modifications may fall within the scope of this invention, which is defined by the appended claims.

What is claimed is:

1. An engine powerplant including intake and exhaust manifolds, and a turbocharger powered by gas flow at an outlet of the exhaust manifold for supplying inlet air to the intake manifold at a boosted pressure, further comprising:
   a supercharger driven directly or indirectly by the engine for establishing a high pressure air supply;
   at least one air injection pipe coupling said high pressure air supply to the exhaust manifold of said engine;
   a hydraulic pump driven by said engine; and
   a hydraulic drive motor coupled to a vehicle drivetrain and powered by hydraulic fluid produced by said hydraulic pump.

2. The powerplant of claim 1, including an array of air injection pipes coupling said high pressure air supply to distributed locations of said exhaust manifold upstream of said outlet.

3. The powerplant of claim 2, wherein said engine discharges exhaust gas into said exhaust manifold at a plurality of locations, and said array of air injection pipes injects air from said high pressure air supply into said exhaust manifold at said plurality of locations.

4. The powerplant of claim 1, including an inlet air filter for filtering atmospheric air supplied to said turbocharger and said supercharger.

5. The powerplant of claim 1, further comprising:
   a hydraulic charge pump driven by said engine; and
   an accessory hydraulic motor driving said supercharger and powered by hydraulic fluid produced by said hydraulic charge pump.

6. The powerplant of claim 1, further comprising:
   a controller for controlling an operating speed of said supercharger.

7. The powerplant of claim 1, wherein said hydraulic pump has a controlled pumping capacity, the powerplant further comprising:
   a controller for controlling the engine speed to a low and substantially constant value while controlling the pumping capacity of said hydraulic pump to satisfy a requirement of said drivetrain.

* * * * *